(12) United States Patent
Allen

(10) Patent No.: US 8,001,424 B2
(45) Date of Patent: *Aug. 16, 2011

(54) SYSTEM AND METHOD FOR FAULT MAPPING OF EXCEPTIONS ACROSS PROGRAMMING MODELS

(75) Inventor: Corville O. Allen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,464

(22) Filed: Feb. 11, 2010

(65) Prior Publication Data

US 2010/0146347 A1 Jun. 10, 2010

Related U.S. Application Data

(63) Continuation of application No. 11/771,390, filed on Jun. 29, 2007, now Pat. No. 7,716,531.

(51) Int. Cl.
*G06F 11/00* (2006.01)
(52) U.S. Cl. ..................... 714/38.1; 714/38.13
(58) Field of Classification Search .................. None
See application file for complete search history.

(56) References Cited

U.S. PATENT DOCUMENTS

| | | | |
|---|---|---|---|
| 6,199,141 B1 | 3/2001 | Weinreb et al. | |
| 6,892,330 B2 | 5/2005 | Lee | |
| 6,961,932 B2 | 11/2005 | Mishra et al. | |
| 7,007,198 B2 | 2/2006 | Boling | |
| 7,069,562 B2 | 6/2006 | Kushnirskiy et al. | |
| 7,120,898 B2 | 10/2006 | Grover et al. | |
| 7,379,846 B1 | 5/2008 | Williams et al. | |
| 7,487,433 B2 | 2/2009 | Sivakumar et al. | |
| 7,644,414 B2* | 1/2010 | Smith et al. | 719/328 |
| 2003/0204645 A1 | 10/2003 | Sharma et al. | |
| 2005/0193286 A1 | 9/2005 | Thatte et al. | |
| 2007/0022321 A1 | 1/2007 | Chua et al. | |

(Continued)

FOREIGN PATENT DOCUMENTS

WO WO0038073 A1 6/2000

OTHER PUBLICATIONS

Samuel, Geogy A., et al. "Framework and Method to Inject Failures into the System for Diagnosing", Oct. 17, 2006, ip.com.

(Continued)

*Primary Examiner* — Michael C Maskulinski
(74) *Attorney, Agent, or Firm* — Kunzler Needham Massey & Thorpe

(57) ABSTRACT

A system and method for mapping exceptions from a first programming model to a second programming model. The system comprises a first device operating a first programming model and a second device operating a second programming model. The first device sends an instruction to, or invokes the second device to execute an instruction. As a result, a fault occurs during execution of the instruction in the second programming model. An exception based on the fault is raised, and returned to the first device. A fault mapping module receives the exception from the first device. The fault mapping module attempts to determine the type of exception received by comparing an identifier with predetermined identifiers indicating exception type. The fault mapping module interprets the exception to generate an interpreted exception recognizable by the first programming model if the exception is determined to be of a predetermined type.

19 Claims, 4 Drawing Sheets

U.S. PATENT DOCUMENTS

2008/0109683 A1     5/2008    Erwin et al.
2009/0049068 A1     2/2009    Adkins et al.
2009/0138511 A1     5/2009    Strub et al.

OTHER PUBLICATIONS

"Web Services Description Language (WSDL) 1.1" (Internet—Google).

Gish et al., "Enterprise Metadata Discovery", A Joint White Paper With IBM and BEA, Dec. 2004.

"Enterprise Metadata Discovery", IBM and BEA collaborate on advancing the J2EE Connector Architecture, Dec. 2004, updated Jun. 2005, http://www-128.ibm.com/developerworks/library/specification/j-emd/.

\* cited by examiner

SYSTEM AND METHOD FOR FAULT MAPPING OF EXCEPTIONS ACROSS PROGRAMMING MODELS

CROSS-REFERENCE TO RELATED APPLICATIONS

This application is a continuation application of and claims priority to U.S. patent application Ser. No. 11/771,390 entitled "SYSTEM AND METHOD FOR FAULT MAPPING OF EXCEPTIONS ACROSS PROGRAMMING MODELS" and filed on Jun. 29, 2007 for Corville O. Allen, which is incorporated herein by reference.

BACKGROUND

1. Field of the Invention

This disclosure relates to error detection. More specifically, the disclosure relates to fault detection in a computing environment.

2. Description of the Related Art

In a computer system, faults, errors, and failures are typically represented by an exception in the system. The exception handling or raising mechanism typically does not contain information that an external device such as a client, based on a different programming model or language can handle appropriately. When one programming model expects a fault in a certain format, there is a requirement to map an exception from a target system to one understood by the programming model.

The need to perform a mapping between the exception to a known fault and how that mapping is plugged in cross programming model invocations and executed are technology specific and implementation specific. There can be a framework and pluggability introduced that keeps the programming models separate, but allow for faults to be mapped and handled accordingly.

The Java to Web Service Definition Language (WSDL) mapping techniques currently used are similar to this approach, but are executed at design time. It is also specific to two systems only, Web Services interfaces interacting with Java type programs.

BRIEF SUMMARY

In one aspect, a method of mapping exceptions from a first programming model to a second programming model is disclosed. An exception is initially received from a first programming model. However, the exception is based on a fault that occurred during the execution of an instruction in a second programming model on a second device. The instruction was transmitted by the first device to be executed on the second device. An identifier associated with the exception is compared with one or more predetermined identifiers that indicate the type of exception to determine if the exception is a business type exception. The exception is then translated according to a set of mapping data to generate a set of translated data if the exception is determined to be the business type exception. Alternatively, an error message is provided if the exception is determined to be a type other than the business type exception.

In another aspect, a system for mapping exceptions from a first programming model to a second programming model is disclosed. The system comprises a first device operating a first programming model and a second device operating a second programming model. The first device sends an instruction to, or invokes the second device to execute an instruction. As a result, a fault occurs during execution of the instruction in the second programming model. An exception based on the fault is raises, and returned to the first device. The system further comprises a fault mapping module configured to receive the exception from the first device. The fault mapping module attempts to determine the type of exception received. This determination may be accomplished by comparing an identifier within the exception with one or more predetermined identifiers that indicate exception type. The fault mapping module is also configured to interpret the exception according to a set of mapping data to generate an interpreted exception recognizable by the first programming model if the exception is determined to be of a predetermined type.

According to another aspect of the present disclosure, there is also provided a computer executable program for executing steps of the above method, a machine readable storage medium with codes of the computer executable program stored thereon, and a computer program product with codes of the computer program encoded thereon.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

A system and method of mapping exceptions across different programming models is disclosed. Mappings often need to be performed between an exception specification in one programming model to an exception specification in a second programming model. For example, a first device or system operating a first programming model may need to communicate with a second device or system operating in a second programming model. It is desirable for an exception raised by a fault occurring within the first programming model to be understood by the second system such that the two systems can successfully communicate with each other.

Therefore, a framework is provided for handling exceptions and fault mapping in a system utilizing a cross programming model. The framework provides a flexible and pluggable mechanism for mapping exceptions to programming model specific faults. The exception from the target programming model systems does not need to mimic the invoking clients fault behavior or data models. A pluggable mechanism provides the opportunity for reuse of the mechanism easily when it applies to different programming models.

Figure 1:
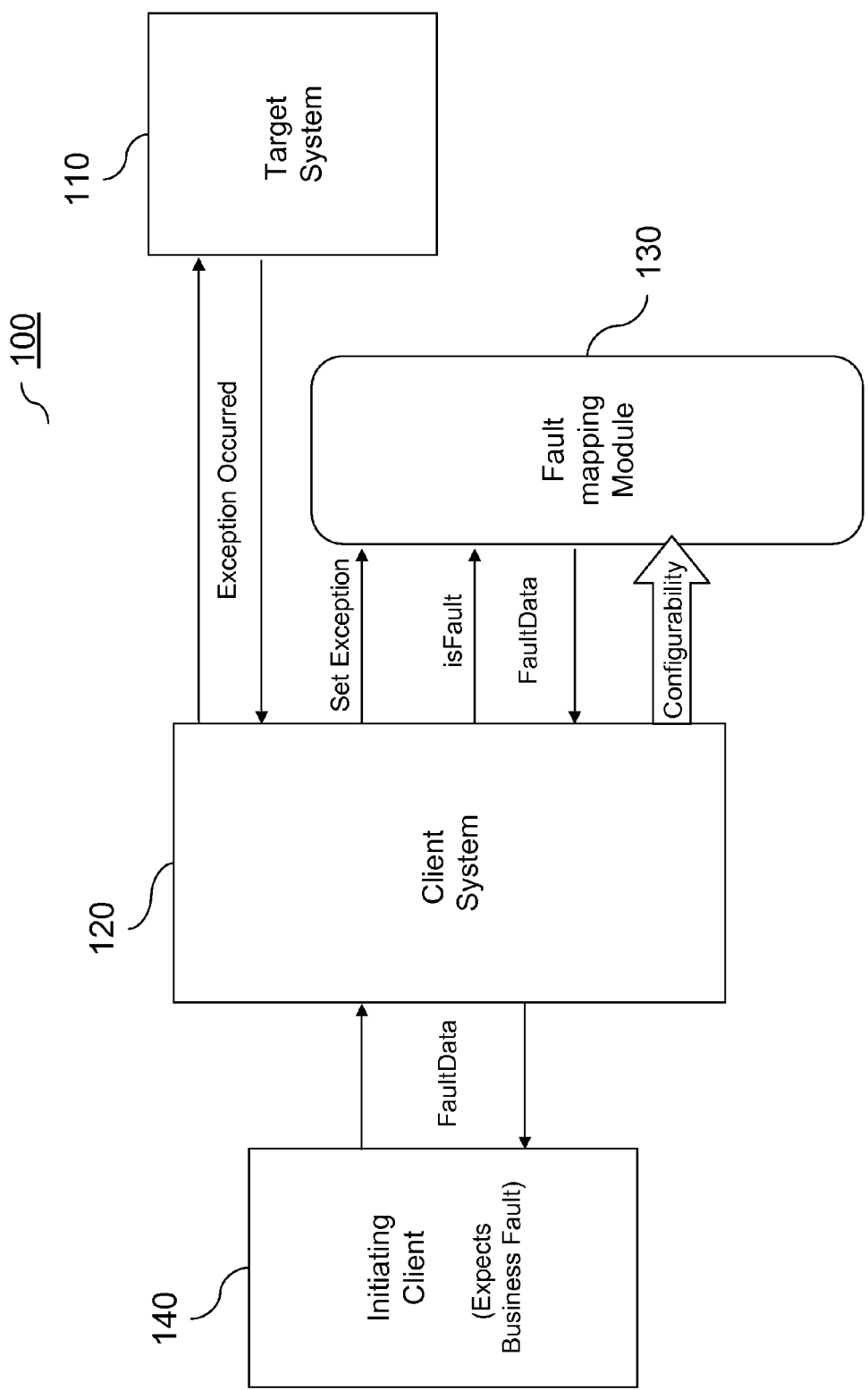
FIG. 1 illustrates a system and method of fault mapping across programming models in accordance with the present disclosure.

FIG. 1 illustrates a block diagram of a system and method for fault mapping of exceptions in a cross programming model. A cross programming model refers to a system in which more than one programming model is used. System 100 utilizes a cross programming model, comprising a target system 110 and a client system 120. The target system 110 operates on a first programming model, while client system 120 operates using a second programming model. For example, consider the target system 110 operates in JAVA, while the client system 120 operates in a Business Processing Execution Language (BPEL).

In one aspect, the first programming model may use a different protocol from the second programming model. A network connectivity protocol or mechanism is one example of a programming model that may vary from one model to the next. In another aspect, the first programming model may be a different programming language from the second programming model. In a client system 120 where the faults and/or exceptions are defined differently than in a target system 110, a fault mapping module 130 is introduced to help translate. In one embodiment, the fault mapping module is designed to be pluggable, and can be located in any place. For example, software systems that interface with telecommunications systems have very different exception indicators which need to be categorized and dealt with in a business friendly manner. Therefore, protocol based software that is integrated into business application systems is an example of a cross programming model.

A fault is a type of error, or incorrect action or calculation performed by software. An error often results from a combination of a defect (code that does not correctly implement the requirements or intended behavior) and a fault (situation or event that exercises a program's susceptibility to error). An error may be detected by the software which can be handled by raising an exception. For instance, attempting to write more files onto a disk that is full is considered an error. Therefore, careful programmers write code that can handle errors that may occur, and prevent them from turning into failures. Strategies for doing so include using error codes and exception handling. An exception can be defined broadly as a signal for indicating error conditions within software.

Consider client system 120 invokes a software procedure found on target system 110. Target system 110 attempts to perform the software procedure, but a fault occurs in the software. An exception is therefore raised by the fault. The exception is returned to client system 120. However, the exception is not understood by the client system, because the exception was raised in JAVA, while the client system only understands or knows how to handle exceptions in BPEL.

Therefore, a fault mapping module 130 is utilized to aid handling of exceptions from a first programming model to a second programming model. The client system 120 therefore sends the exception received from the target system to fault binding module 130. A pluggable mechanism provides the opportunity for reuse of the mechanism so that the fault mapping module can be easily applied to many different programming models.

The fault mapping module 130 initially determines from what type of fault the exception arose. In one aspect, this involves determining if the fault is considered a business fault. Exceptions can typically be categorized according to whether they occur due to a technical failure or as the result of a violation of a business rule. For example, an example of a situation in which a business fault occurs is when an attempt is made to create a new customer with a specific customer number, however a customer already exists with that customer number. The business rules for the system prevent the new customer from being created because each customer must have a unique customer number. An example of a technical failure might be that a variable within some code was assigned a null value, and returns an error. A system specific exception is another example of a technical failure. This may include connectivity issues such as the network connection is down, or a failure of a device causes software to fail. Since business type faults are recoverable from a business perspective, the user or the business process can take reasonable action and make decisive decisions based on this business fault. Therefore, business type exceptions and technical failures are two types of exceptions that can have very different usage patterns and it is valuable to have different mechanisms for handling them.

In one aspect, the fault mapping module 130 simply makes a determination according to whether or not the exception is considered a business type exception. However, in other aspects, it may be desirable to handle other types of exceptions such as system specific exception types. Therefore, in other aspects, the fault mapping module may determine the type of fault or exception based on any one of a plurality of different types. In this aspect, the fault mapping module is configurable to handle any number of different types of types or programming models.

The type of exception may be determined in a plurality of ways. In one aspect, the type of exception is identified through an identifier such as an error code associated with the exception. For example, a predetermined code may indicate that the exception is based on a business type fault, and therefore an exception comprising the same code would be considered a business type exception. Similarly, a predetermined range of codes may be known to indicate a certain type of fault or exception. Other methods for determining the exception type include analyzing the content of the exception itself. In a class hierarchy system, the super types associated with an exception may be used to determine the exception type. The method through which the fault mapping module determines the exception type is configurable such that an exception type can be determined in more than one way.

If the fault mapping module 130 determines the exception raised is due to a business fault, the fault mapping module then queries fault mapping data to retrieve the business data that represents the corresponding business fault. The fault mapping data comprises a plurality of data sets or pairs. Each data pair/set comprises data representative of an exception in a first programming model, and data representative of the same exception in a second programming model. In the example discussed thus far, the fault mapping data comprises data representative of an exception raised in JAVA by the target system 110, and corresponding business data that can be understood in BPEL. Fault mapping data may be stored in a database table, a text file, a memory location, or in any of a plurality of ways. The mapping could be in an external database, held in memory in a map such as name-value pairs, or keys, or built directly into the code of the fault mapping module.

If the fault mapping module 130 determines the exception raised is not due to a business fault, the fault mapping module returns the runtime error it received from the target system, or a representation of that runtime error. The client system uses the runtime error to propagate the error to components of interest within the system. There may be other types of system specific exception types. The fault binding will be queried to return system specific exception types that represent a known condition that the client system will handle. The client system will take appropriate action based on the exception type and the requirements of that programming model within the system.

An example of an interface for the fault mapping module is as follows.

```
public interface FaultBinding {
    /**
     * Returns an identifier used to instantiate and execute
     the services provided by the fault binding.
     */
    public String getType( );
    public void setType (String type);
    /**
     * Used by the client programming model to specify the
     fault exception received from the target system to be
     analyzed by the Fault Binding.
     *
     */
    public void setException(Throwable t);
    /**
     * Invoked by the target system after a fault has been set
     to determine whether it represents a business fault.
     */
    public boolean isBusinessFault( );
    /**
     * Invoked after determining that the data represents a
     business fault.
     */
    public Object getBusinessFaultData( ) throws Exception;
    /**
     * Used to retreive the fault exception contained within
     the Fault Binding.
     */
    public Throwable getException( );
    /**
     * Gets the collection of configurable properties for this
     fault binding that add dynamicity and flexibility to it's
     functionality.
     */
    public Collection getProperties( );
    /**
     * Sets configuration values for this fault binding that
     allows it to execute differently based on these values.
     */
    public void setProperties(Collection properties);
    /**
     * Used by the client system to get a runtime error for
     from the fault binding provided that the fault exception
     falls in that category.
     */
    public Throwable getError( );
}
```

Figure 2:
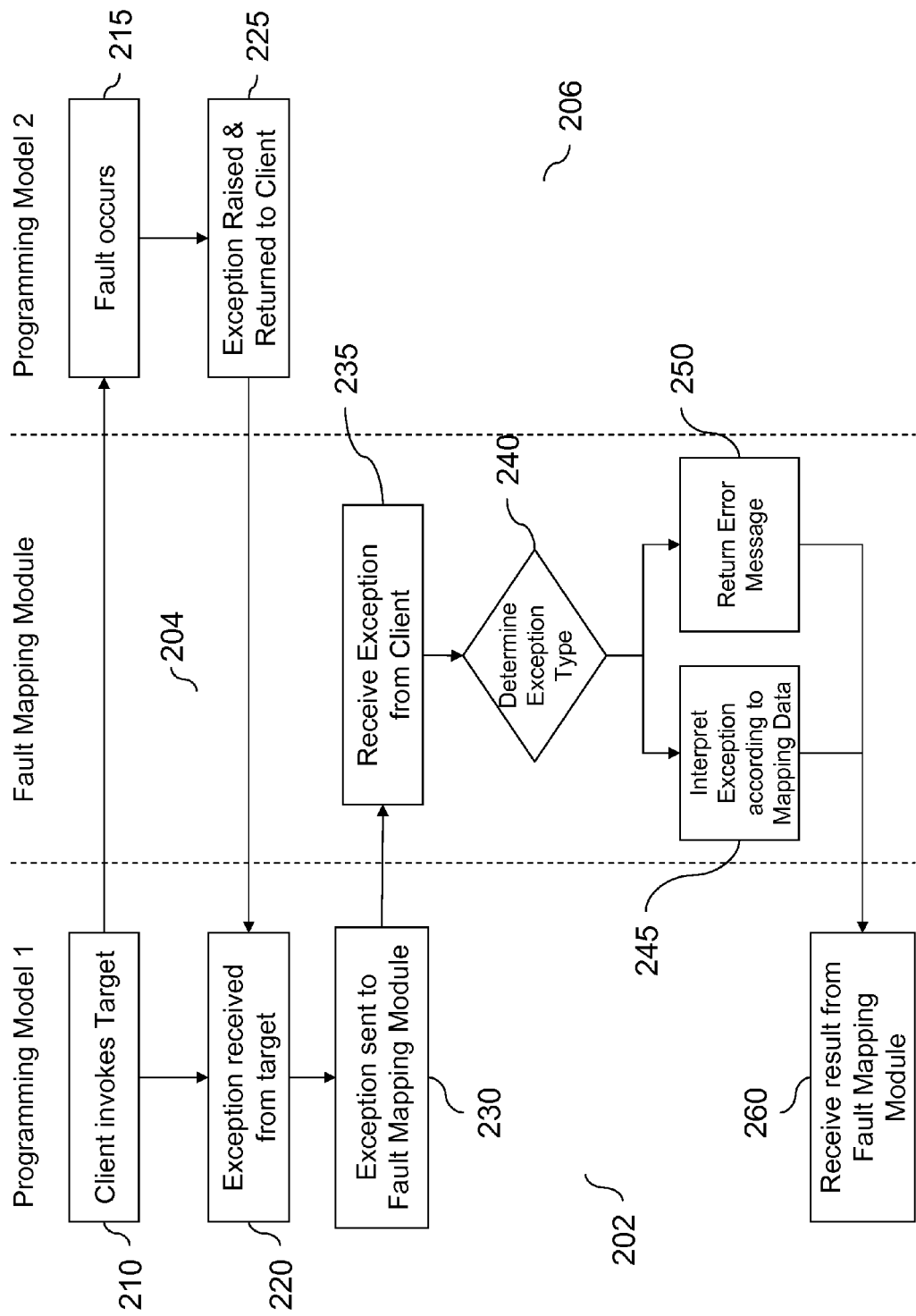
FIG. 2 is a flow diagram of a method in accordance with one aspect of the present disclosure.

FIG. 2 illustrates a block flow diagram of a system and method of fault mapping from a first programming model to a second programming model.

The block flow diagram is divided into three regions. Activities performed by a first programming model are shown on the left portion of the page 202. Activities performed by the fault mapping module are shown in the middle portion 204, and activities performed by a second programming model are shown in the right portion 206.

A first computer operating a first programming model initially invokes a process or procedure on a second computer operating a second programming model as indicated by block 210. In one aspect, the relationship between the first computer and second computer is a client-server relationship. In another aspect, the relationship may be a peer to peer relationship. In yet another aspect, the first programming model and second programming model may be operating on the same computer hardware.

The request to invoke a process is received by the second programming model, and the process is run. A fault occurs as is indicated at block 215. An exception is raised as a result of the fault, and the exception is returned to the requestor, or in this case, the first computer 120 operating the first programming model. Because the requesting computer is operating a first programming model that is different from the second programming model, it does not recognize how to handle the exception that has been returned to it from the second computer 110. Therefore, the first computer 120 transmits the exception received from the second programming model to a fault mapping module, as is indicated at block 230.

The fault mapping module receives the exception from the client computer, as indicated at block 235. The fault mapping module 130 then analyzes the exception to determine what type of fault the exception arose from, as indicated at block 240. In one aspect, the fault mapping module 130 determines if the exception arose from a business type fault. In another aspect, the fault mapping module 130 determines if the exception arose from a system specific error. In the example shown in FIG. 2, the fault mapping module 130 determines whether or not the exception was raised by the occurrence of a business type fault. This determination may be performed by analyzing an identifier such as a code found within the exception data, and comparing the code with one or more codes which are known to indicate a business type fault. If the exception is identified as being based on a business type fault, the fault mapping module 130 further queries fault mapping data to retrieve the business data that corresponds to the exception, as is shown at block 245. In one aspect, the fault mapping data may be stored within a database. In the case that the first programming model is BPEL, and the exception is the result of a business type fault, the client receives the appropriate business data to fully handle the exception.

If the fault mapping module determines the exception is not based on a business type fault, and therefore is the result of some other kind of error, an error message is returned, as indicated by block 250. In either case, a result is finally returned to the first computer operating the first programming model, as shown at block 260.

Figure 3:
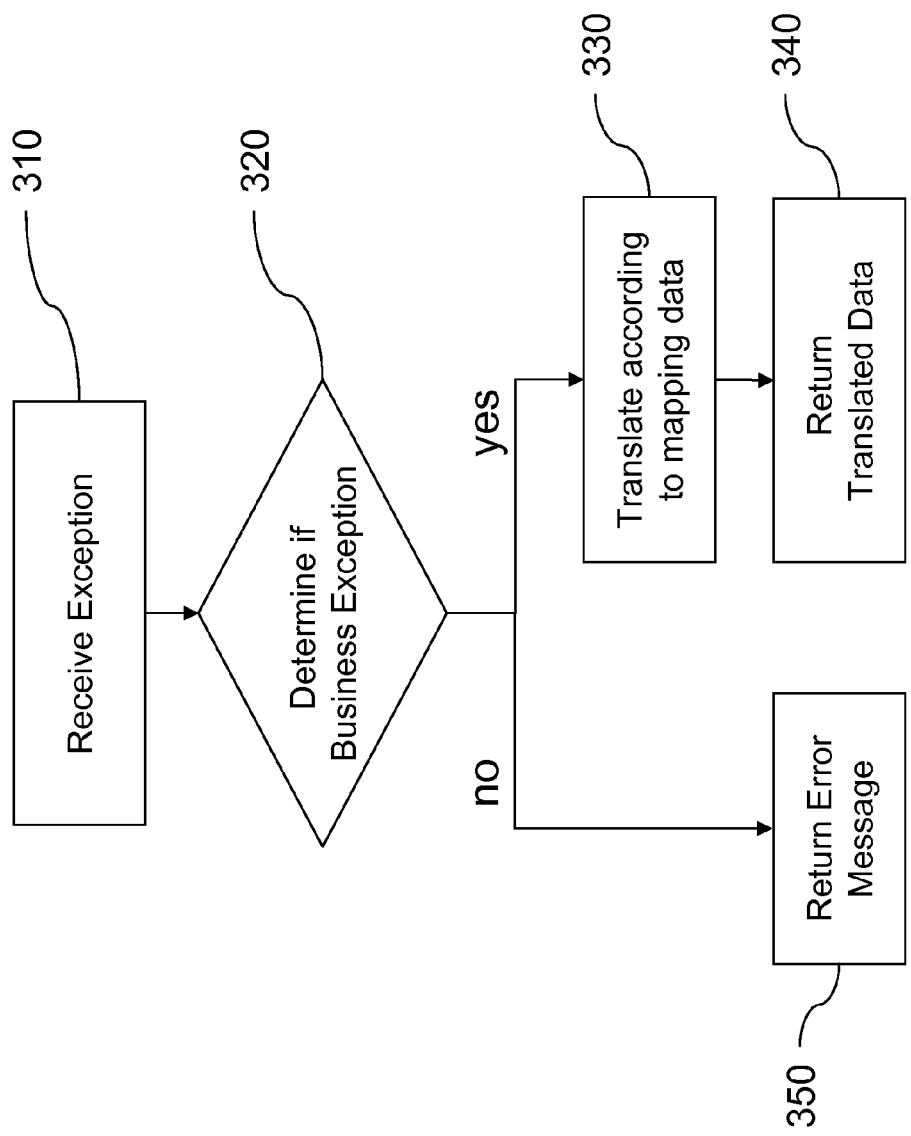
FIG. 3 illustrates a block flow diagram of a method fault mapping as performed by a fault mapping module in accordance with one aspect of the present disclosure.

FIG. 3 illustrates a block flow diagram of a method for fault mapping of exceptions as performed by a fault mapping module in accordance with one aspect of the present disclosure. At block 310, an exception is received as sent by a first device operating a first programming model. However, the exception is based on a fault that occurred during the execution of an instruction in a second programming model on a second device. The instruction was transmitted by the first device to be executed on the second device. The exception is analyzed to determine if the exception is a business type exception, as indicated by decision block 320. The determination may, for example, be performed by comparing an identifier within the exception with one or more predetermined identifiers that indicate the exception type. In one aspect, the identifier is a code. If the exception is determined to be a business type exception, the exception is then translated according to a set of mapping data to generate a translated exception. The translation step is indicated by block 330. The translated exception or data, which is now recognizable by the first programming model, is then transmitted back to the first device for processing, as is indicated by block 340. Alternatively, if the exception is determined to be a type other than the business type exception, an error message is provided as indicated at block 350.

The fault mapping module of the present disclosure may be utilized for those cross programming model systems that need to distinguish and handle exceptions as true errors in the software, or faults. For example, this includes IBM WebSphere Application Server and Service Component Architecture programming model implementations that interface with other systems.

Figure 4:
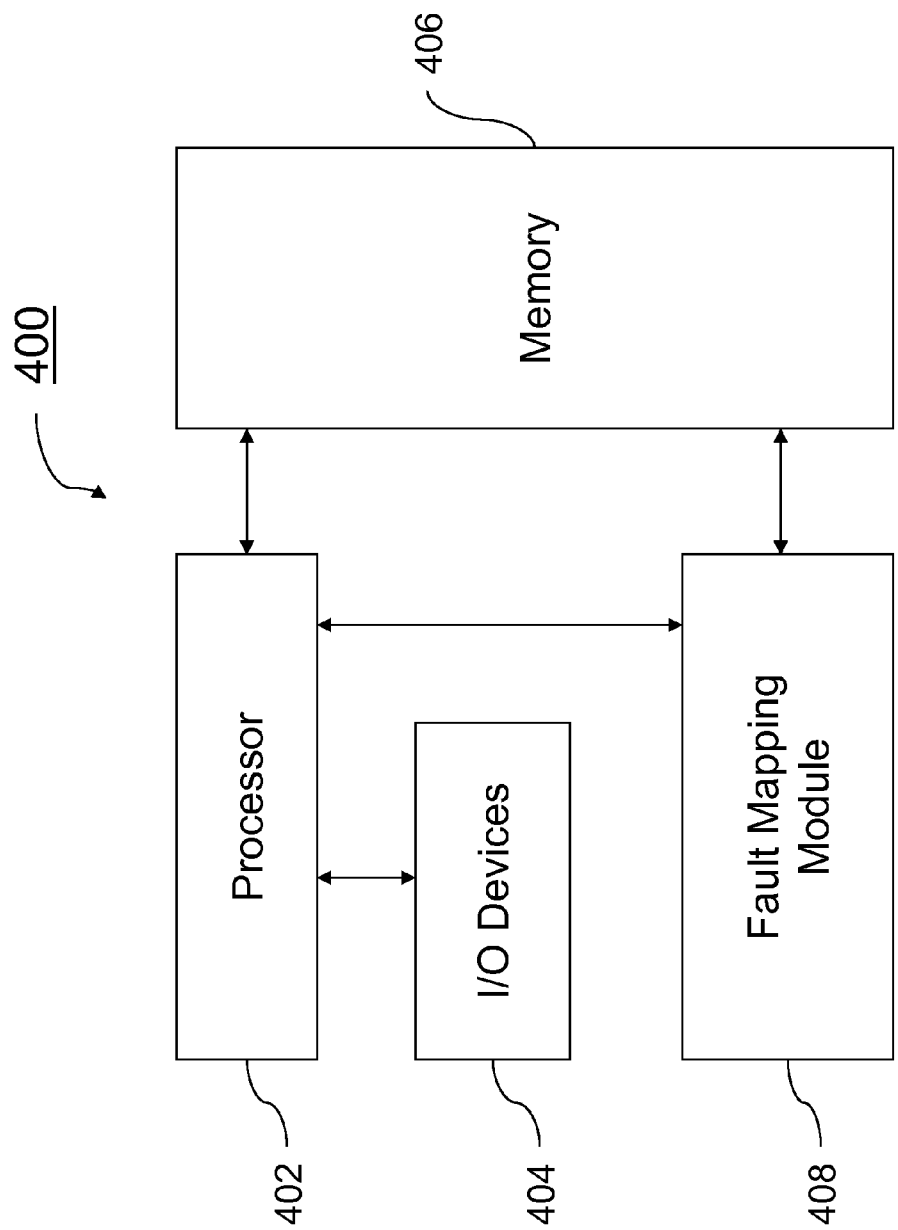
FIG. 4 illustrates a block diagram of a system 400 that utilizes a fault mapping module.

FIG. 4 illustrates a block diagram of a system 400 that utilizes a fault mapping module. In one embodiment, the system 400 is suitable for storing and/or executing program code and is implemented using a general purpose computer or any other hardware equivalents. Thus, the system 400 comprises a processor 402, a memory 406, e.g., random access memory ("RAM") and/or read only memory ("ROM"), a fault mapping module 408, and various I/O devices 404.

The processor 402 is coupled, either directly or indirectly, to the memory 406 through a system bus. The memory 606 can include local memory employed during actual execution of the program code, bulk storage, and/or cache memories which provide temporary storage of at least some program code in order to reduce the number of times code must be retrieved from bulk storage during execution.

The I/O devices 404 can be coupled directly to the system 400 or through intervening input/output controllers. Further, the I/O devices 404 can include a keyboard, a keypad, a mouse, a microphone for capturing speech commands, a pointing device, and other user input devices that will be recognized by one of ordinary skill in the art. Further, the I/O devices 404 can include a receiver, transmitter, speaker, display, image capture sensor, biometric sensor, etc. In addition, the I/O devices 404 can include storage devices such as a tape drive, floppy drive, hard disk drive, compact disk ("CD") drive, etc.

Network adapters may also be coupled to the system 400 to enable the system 600 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include, but is not limited to, firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W") and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

*IBM and WebSphere are registered trademarks of International Business Machines Corporation in the United States, other countries, or both.

What is claimed is:

1. A computer program product comprising a computer readable storage medium having a computer readable program, wherein the computer readable program when executed on a computer causes the computer to:
    receive, from a first device operating a first programming model, an exception that includes a set of data and is based upon a fault that occurred during execution of an instruction in a second programming model operating on a second device, the instruction having been transmitted by the first device to the second device;
    determine a type of the exception by comparing an identifier associated with the exception with one or more predetermined identifiers that indicate exception type;
    determine if the exception is one of a business type exception and a system specific exception; and
    interpret the exception according to a set of mapping data to generate an interpreted exception if the exception is determined to be of a predetermined type.

2. The computer program product of claim 1 wherein the first programming model includes a business process execution language.

3. The computer program product of claim 1 wherein the first programming model utilizes a communication protocol that is different from the second programming model.

4. The computer program product of claim 1 wherein the identifier includes a code.

5. The computer program product of claim 1 wherein the set of mapping data is stored in a database.

6. The computer program product of claim 1 wherein the exception is determined to be a business type exception and the business type exception is based on a fault resulting from a violation of a business rule.

7. The computer program product of claim 1 wherein the exception is determined to be a system specific exception type, and the error message is relevant to the system specific exception type.

8. A system comprising:
    a first device operating a first programming model;
    a second device operating a second programming model, the second device being invoked by the first device to execute an instruction; and
    a fault mapping module configured to receive an exception from the first device, the exception based on a fault that occurred during the execution of the instruction in the second programming model, the fault mapping module configured to determine a type of the exception by comparing an identifier within the exception with one or more identifiers indicating a type, wherein the fault mapping module determines if the exception is one of a business type exception and a system specific exception and interprets the exception according to a set of mapping data to generate an interpreted exception if the exception is determined to be of a predetermined type.

9. The system of claim 8 wherein the first programming model includes a business process execution language.

10. The system of claim 8 wherein the fault mapping module is configurable to interpret one or more different types of exceptions.

11. The system of claim 8 wherein the business type exception is based on a fault resulting from a violation of a business rule.

12. The system of claim 8 wherein the fault mapping module returns an error if the type of the exception is an unknown type.

13. A method comprising:
   receiving from a first device operating a first programming model, an exception that includes a set of data and is based upon a fault that occurred during execution of an instruction in a second programming model operating on a second device, the instruction having been transmitted by the first device to the second device;
   determining a type of the exception by comparing an identifier associated with the exception with one or more predetermined identifiers that indicate exception type;
   determining if the exception is one of a business type exception and a system specific exception; and
   interpreting the exception according to a set of mapping data to generate an interpreted exception if the exception is determined to be of a predetermined type.

14. The method of claim 13 wherein the first programming model includes a business process execution language.

15. The method of claim 13 wherein the first device and the second device have a client-server relationship.

16. The method of claim 13 wherein the first programming model utilizes a communication protocol that is different from the second programming model.

17. The method of claim 13 wherein the interpreted exception is returned to the first device and handled by the first programming model.

18. The method of claim 13 wherein the business type exception is based on a fault resulting from a violation of a business rule.

19. The method of claim 13 wherein the exception is determined to be a system specific exception type, and the error message is relevant to the system specific exception type.

* * * * *